(12) United States Patent
Mayo et al.

(10) Patent No.: US 8,489,616 B2
(45) Date of Patent: Jul. 16, 2013

(54) IDENTIFYING SOFTWARE

(75) Inventors: Andrew Mayo, Cookham (GB); Geoff Collins, Epsom (GB)

(73) Assignee: 1e Limited, London (GB)

( * ) Notice: Subject to any disclaimer, the term of this patent is extended or adjusted under 35 U.S.C. 154(b) by 0 days.

(21) Appl. No.: 13/430,442

(22) Filed: Mar. 26, 2012

(65) Prior Publication Data

US 2013/0014096 A1 Jan. 10, 2013

Related U.S. Application Data

(63) Continuation-in-part of application No. 13/178,133, filed on Jul. 7, 2011.

(51) Int. Cl.
*G06F 17/30* (2006.01)

(52) U.S. Cl.
USPC ........... 707/748; 707/736; 707/755; 717/172; 717/173

(58) Field of Classification Search
USPC ................... 707/736, 748, 755; 717/172, 174
See application file for complete search history.

(56) References Cited

U.S. PATENT DOCUMENTS

| | | | | |
|---|---|---|---|---|
| 5,745,879 A * | 4/1998 | Wyman | ........................... | 705/1.1 |
| 6,278,984 B1 * | 8/2001 | Itami et al. | ...................... | 705/57 |
| 6,457,076 B1 * | 9/2002 | Cheng et al. | ..................... | 710/36 |
| 7,139,737 B2 * | 11/2006 | Takahashi et al. | .............. | 705/59 |
| 7,197,431 B2 * | 3/2007 | Barritz | ........................... | 702/186 |
| 7,529,919 B2 * | 5/2009 | Lampson et al. | .................. | 713/1 |
| 7,730,480 B2 * | 6/2010 | Isaacson | ........................ | 717/174 |
| 7,743,373 B2 * | 6/2010 | Avram et al. | .................. | 717/174 |
| 2003/0140266 A1 | 7/2003 | Fink et al. | | |
| 2004/0039916 A1 | 2/2004 | Aldis et al. | | |
| 2005/0091535 A1 * | 4/2005 | Kavalam et al. | .............. | 713/201 |
| 2005/0091655 A1 * | 4/2005 | Probert et al. | ................. | 718/100 |
| 2005/0278395 A1 | 12/2005 | Sandaire | | |
| 2007/0100892 A1 | 5/2007 | Kephart et al. | | |
| 2007/0150587 A1 * | 6/2007 | D'Alo et al. | ................... | 709/224 |
| 2009/0031286 A1 | 1/2009 | Yee et al. | | |
| 2009/0037336 A1 | 2/2009 | Sunata | | |
| 2009/0228982 A1 | 9/2009 | Kobayashi | | |
| 2009/0313630 A1 | 12/2009 | Hori | | |
| 2011/0238710 A1 * | 9/2011 | Barritz et al. | ................. | 707/803 |

* cited by examiner

*Primary Examiner* — Debbie Le
(74) *Attorney, Agent, or Firm* — Baker & Hostetler, LLP

(57) ABSTRACT

Software installed on a computer network is often inconsistently, or even incorrectly, identified. The same software may be identified in different ways. A catalogue of standardized identifiers is provided. The actual identifiers of software installed on the network are accessed and mapped to the standardized identifiers of the catalogue. The standardized identifiers are used to manage the installed software, monitor license compliance and/or, monitor maintenance agreements amongst other uses. Data relating to the use of the software is also be obtained and associated with the identification data. Identified software is uninstalled if it complies with a preset criterion. The usage data together with the standardized identifiers may be used to un-install un-used or under used software and licenses cancelled or reallocated. The standardized identifiers may be used to identify if forbidden software is being used and if so to compulsorily un-install the software.

32 Claims, 10 Drawing Sheets

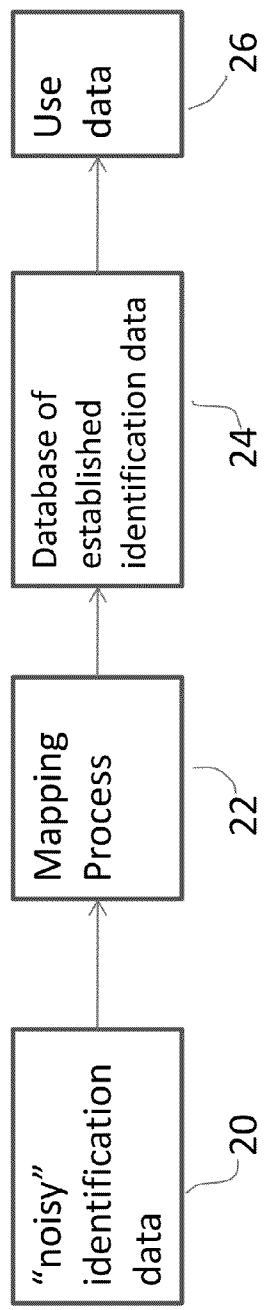
FIG. 2
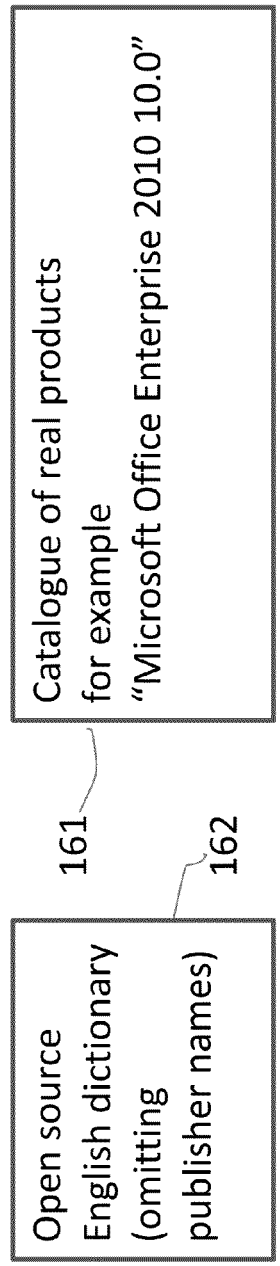
FIG. 3A
FIG. 3B
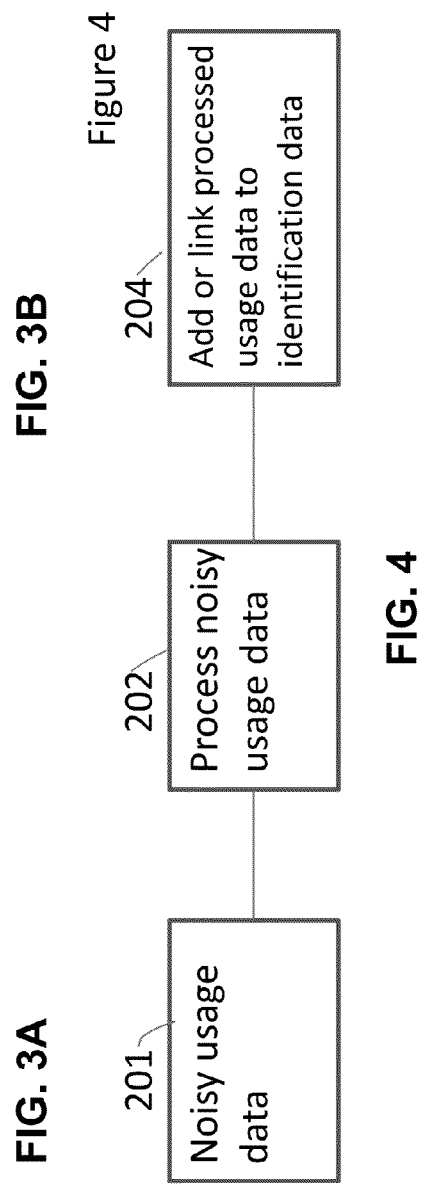
FIG. 4

IDENTIFYING SOFTWARE

CROSS-REFERENCE TO RELATED APPLICATIONS

This application is a Continuation-in-Part (CIP) of U.S. patent application Ser. No. 13/178,133, filed on Jul. 7, 2011, the disclosure of which is incorporated herein by reference in its entirety.

FIELD OF THE INVENTION

The present invention relates to identifying software. More particularly, the present invention relates to software license management, identifying usage of software and management of software on a network.

BACKGROUND OF THE INVENTION

A network of computers can be very large with hundreds or more computers on the network each with one or more software packages. Various computers may have different versions of the same software. Many software packages are subject to licenses and may be also subject to maintenance charges. Managers wish to manage a network in a cost efficient manner. It is necessary to ensure all software which requires a license is properly licensed. Also it is desirable that unused software is removed to reduce the number of licenses and maintenance agreements to reduce costs. Systems for doing that have been proposed.

SUMMARY OF THE INVENTION

It is desirable to minimise the number of different versions of what is nominally the same software to minimise support and administration costs.

It may also be desirable to replace one version of software by another version to reduce costs and/or to provide the user with software more appropriate to their needs.

In order to manage a network, and for the purpose of managing licenses, it is necessary to identify the software installed on the network. One aspect of the present invention seeks to provide a process for reliably identifying software installed on a computer, or on computers in a network.

The present invention is based on the recognition of an unexpected problem. It is conventionally expected that software names conform to the pattern publisher, product name, version identifier, for example "Microsoft Office Standard 2010 10.0" (Microsoft is a Registered Trademark).

However there is in fact no standard so some software names do not conform to that pattern. Furthermore, what is the same software may be marketed under different names, and/or version identifiers (also known as a release numbers). Also, it has been found that programmers, or others responsible for naming software, make mistakes such as representing the publisher's name incorrectly. This creates difficulties in identifying software and determining what software packages are in the fact the same.

In accordance with one aspect of the present invention, there is provided a computer implemented method of establishing the identity of software installed on a computer, the software being purportedly identified by identification data associated with the installed software, the method using a catalogue of established software identification data, the method comprising:

mapping the purported identification data to established identification data in the catalogue; and using the identification data to which the purported identification data is mapped as the established identification data of the installed software;

determining whether to uninstall identified software according to at least one predetermined un-installation criterion; and un-installing the software if the at least one criterion is satisfied.

By using such mapping, a coherent and consistent set of software identification data is created so that for example plural items of the same software are identified by the same established identification data. That simplifies the administration of software.

The method may be applied to a computer network in which the method is carried out by an identification processor which accesses the data base of a systems management tool.

Another aspect of the invention provides a computer system comprising a plurality of user's computers and one or more administrative computers linked by a network, the system comprising:

a systems management tool installed on a said administrative computer, the systems management tool storing software identification data and computer identifiers identifying the software installed on the computers of the system and also storing usage data relating to the usage of the installed software:

a license management tool installed on a said administrative computer, the license management tool storing data identifying licensed software and the computers on which it is installed: and an identification data processing engine installed on a said administrative computer, the engine having a catalogue of standardised software identification data and being configured to map identification data derived from the systems management tool to the standardised identification data of the catalogue to produce standardised identifiers of the installed software, map identification data derived from the license management tool to standardised identification data of the catalogue to produce standardised identifiers of the licensed software, map usage data derived from the systems management tool to the standardised identifiers of the installed software;

the license management tool being configured to correlate the standardised identifiers of the installed software and the usage data mapped thereto with the standardised identifiers of the licensed software; and an un-installation engine configured to determine whether to uninstall identified software according to at least one predetermined un-installation criterion and to un-install the software if the at least one criterion is satisfied, Thus, examples of the present invention are based on the recognition that software installed on a computer network is often inconsistently, or even incorrectly, identified. The same software may be identified in different ways. A catalogue of standardised identifiers is provided. The actual identifiers of software installed on the network are accessed and they are mapped to the standardised identifiers of the catalogue. The standardised identifiers are used to manage the installed software, monitor license compliance and/or, monitor maintenance agreements amongst other uses. Data relating to the use of the software may also be obtained and associated with the identification data. The usage data together with the standardised identifiers allows managers to more reliably manage software on the network. For example un-used software may be un-installed and licenses cancelled or reallocated.

Embodiments of the present invention use identification data as provided by software authors and publishers in the software even though that data may be subject to errors and inconsistencies. The identification data used is the conventional publisher name, and/or product name together with the version identifier if it exists. Embodiments of the present invention also use the conventional product codes which are or should be in the software if they are present. Thus, normal identification data, as conventionally provided by authors or publishers, are used without the need for special or unconventional identification codes.

Further features and advantages of the invention will become apparent from the following description of illustrative embodiments of the invention, given by way of example only, which is made with reference to the accompanying drawings.

BRIEF DESCRIPTION OF THE DRAWINGS

FIG. 2 is a schematic flow diagram of an overview of processes carried out by an example of the present invention to standardise data identifying software installed in the network of FIG. 1;

FIGS. 3A and 3B are schematic diagrams of a dictionary and a catalogue used in the process of FIG. 2;

FIG. 4 is a schematic flow diagram of an overview of processes carried out by an example of the present invention to determine usage of software installed in the network of FIG. 1 and to add data relating to usage to the data identifying the installed software;

DETAILED DESCRIPTION OF THE INVENTION

Overview

Embodiments of the invention may:

i) discover what programs, e.g. software applications, are installed on one or more computers; and ii) provide a process for uninstalling software identified as potentially undesirable or unused.

Embodiments of the invention may also iii) monitor usage of the programs;

iv) discover what different versions of the nominally same software are being used; and/or v) reconcile the discovered programs with a database of licenses.

That enables a network manager to: ensure software is appropriately licensed; move all users to the same and most recent version; save costs by reducing license administration of many different versions; reduce the cost of supporting many different versions of software; save costs by eliminating unused software; eliminating or reallocating unused licenses; and/or provide software appropriate to the needs of the users; and if necessary un-install undesirable or unused or underused software.

Software is apparently conventionally identified by publisher name, product name and version identification: e.g. "Microsoft Access 2010 10.2". It would at first sight seem simple to derive the identity of software packages from such identification but it is not because in fact there is no standard way of identifying software which all providers adhere to. Even one publisher may not identify their own software packages in a consistent way. Also what is basically the same software may have very many different versions, or different items of the same version may be identified in different ways. Generally it has been found that authors of software make errors in identification, make spelling errors, do not include all the version information, and/or do not adhere to the apparently conventional "publisher name, product name, version identifier" format. For example it has been found that in some cases the version identifier has been combined with the product name or the publisher name has been combined with the product name. Such identifiers are described as "noisy" hereinafter. In some cases the product name and the publisher name are the same; e.g. winzip.

The following description refers to databases. The term "database" is used in the general sense of a collection of data stored in a data store. A database described herein by way of ease of description as a single database may be a set of different data tables from which the relevant data is derived.

Example of a Network

Figure 1:
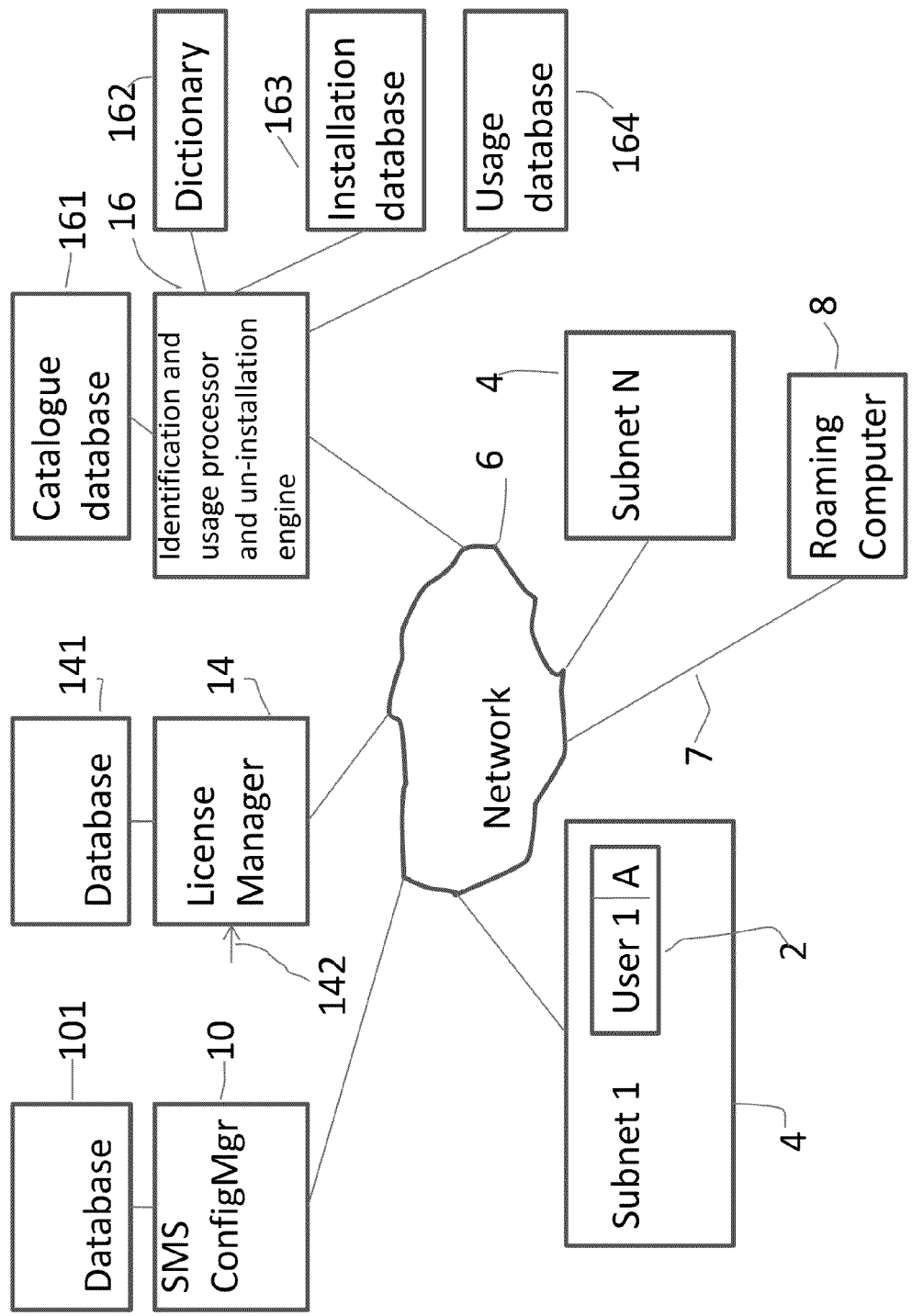
FIG. 1 is a schematic and simplified block diagram of a network in which an example of the present invention may be implemented.

Embodiments of the invention will be described by way of example with reference to a computer network as shown in FIG. 1. The network of FIG. 1 is not a public network: it is a network private to an enterprise. The enterprise may be a public or private company for example. The network of FIG. 1 is usable only by people authorised by the enterprise.

Users of the network have computers 2, which may be on subnets 4, and are linked by the network symbolised at 6. Some computers 8 may be roaming away from the network 6. For example, the network may be linked to another network 7, for example the Internet, and computers 8 owned or managed by the enterprise may roam and use the Internet to connect to the enterprise network or connect to it in other ways, for example via a Virtual Private Network (VPN) 7.

The network comprises a systems management tool (SMT) 10. An example of such a tool is a Configuration Manager (ConfigMgr), also formerly known as Systems Management Server (SMS), provided by Microsoft Corporation. Other companies also provide systems management tools. The tool 10 has a database 101 storing data relating to the configuration of the network. The systems management tool uses agents on the computers 2, 8 which report regularly to the systems management tool 10. An agent A on a computer 2, 8, identifies the software installed on the computer and the times of use of the software and reports regularly to the systems management tool 10.

An installer, for example Microsoft Installer, 10 may be used for installing software on computers of the network or software may be installed by users directly on their computers. The agents detect the software however it is installed.

The term "software" includes patches for, and updates of, software already installed on the network, and new software packages. The database 101 stores data identifying all software installed on computers of the network using the systems management tool.

The network also has a license manager 14 and database 141 for recording data relating to the licensing of software installed on the network. The data of the license database is entered by the user via an interface 142. As will be discussed, the license manager may also store in the database 141 data relating to maintenance agreements for installed software. That data also would be entered by the user via the interface 142.

The network also has an identification and usage processor 16 which accesses a database 161 storing a catalogue of established software identifiers. In the example of FIG. 1, the catalogue is a database of software identifiers created manually, the identifiers complying with the form publisher, product name, version identifier.

The catalogue also includes for each software item an indication of whether it should be licensed. The catalogue may also include product codes but the catalogue may in practice be only sparsely populated with product codes.

Referring to FIG. 2, for the purposes of identifying software installed on computers of the network, the processor 16 accesses 20 "noisy" identification data derived from the database 101 of the systems management tool 10 and applies a mapping process 22 to map the noisy data to standardised, software identifiers in the catalogue. The mapping establishes 24 the catalogued software identifier for the noisy data and the established or standardized identifier is stored in an installation database 163 associated with the processor 16 as installation data.

An example of the mapping process uses an English dictionary. Referring to FIG. 3A, the English dictionary may be an open source dictionary. Preferably, it omits publisher names unless a publisher name is, or includes, an ordinary English word for example "apple" or "system". Referring to FIG. 3B, the catalogue 162 lists software identifiers in the form "publisher name, product name, version identifier"; e.g. Microsoft Office Enterprise 2010 10.0". The catalogue of software identifiers is, in this example, manually generated.

Referring to FIG. 4, the processor 16 also accesses 201 "noisy" usage data relating to the use of software in computers of the network, processes 202 it and adds, or otherwise links or associates, 204 the processed usage data to the installation data (the identification data) established by the process of FIG. 2 for the installed software and which is stored in the installation database 163.

Overview of Data Processing

Figure 5:
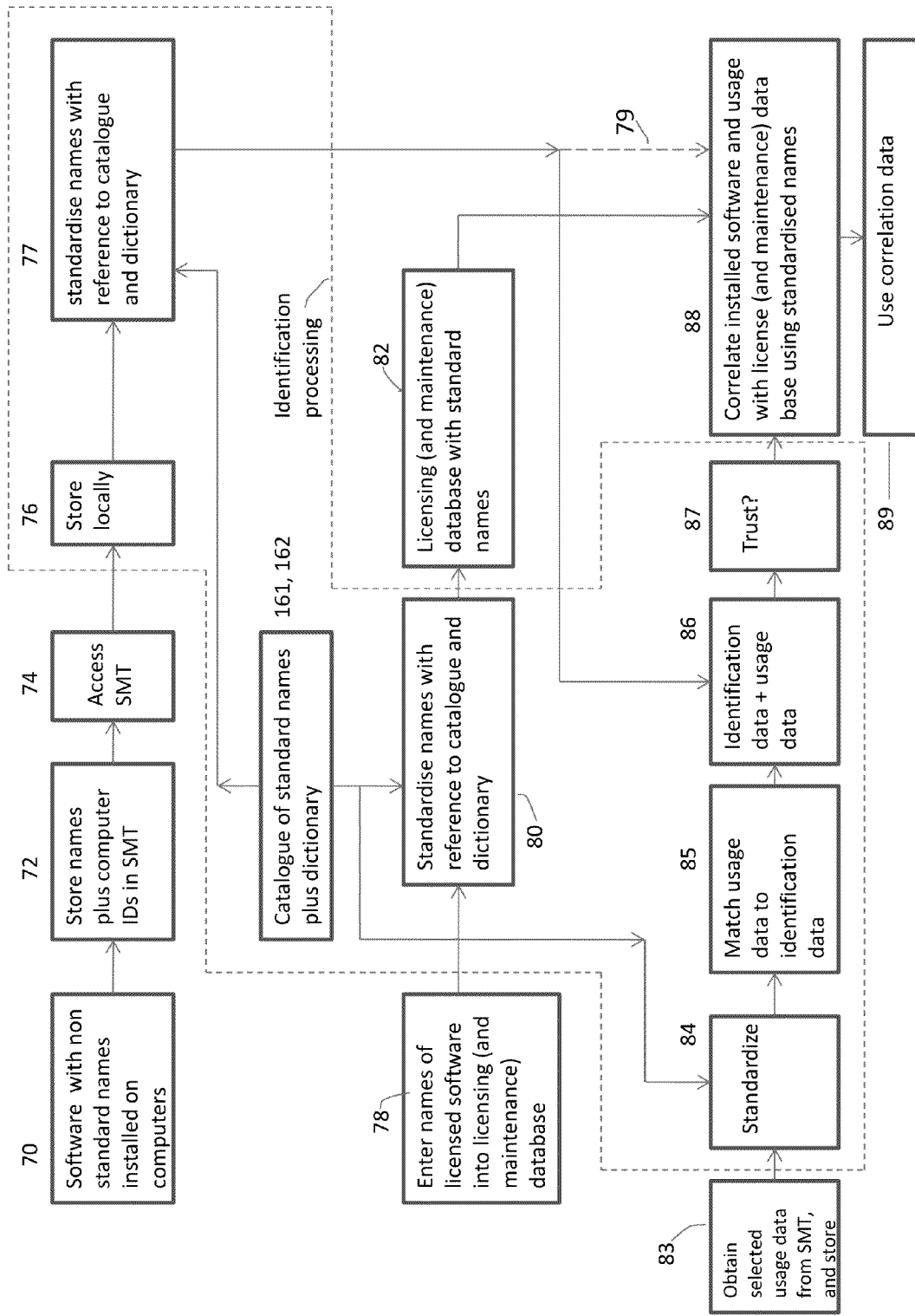
FIG. 5 is a schematic flow diagram of an overview of processes carried out by an example of the present invention.

Referring to FIG. 5, as indicated at 70, software is installed on computers of the network. The identifiers of the software may be "noisy" as discussed above. The agents A on the computers provide the identifiers to the systems management tool 10. As indicated at 72, the identifiers are stored in the database 101 of the systems management tool (SMT) 10. The identifiers are stored with the identifiers of the computers on which the software is installed. The identifiers of the computers may be GUIDs (Globally Unique Identifiers). Thus the data base 101 of the SMT 10 comprises data of the form Machine 1, software ID1, software ID2 . . .

Machine 2, software ID1, Software ID5 . . .

Usage data, which will be described hereinbelow, is also stored. The usage data is reported by the agents A.

The process of FIG. 5 involves accessing the System Management Tool as indicated at 74 and storing 76 the data relating to the installed software in a store local to the identification processor 16. That is not essential to the process but is useful in a network to avoid accessing the systems management tool for the purposes of the process of FIG. 2. Storing the data locally to the identification processor 16 reduces the load on the network.

The installation data (i.e. the identifiers of the installed software) is "standardized" or "sanitized" as indicated at 77 by a process which will be described with reference to FIGS. 6 to 8. That process involves reference to the catalogue 161 and the dictionary 162.

As indicated at 78, license information including the identifiers of licensed (and of maintained) software are entered into the licensing database 141. The entering of the identifiers is done manually via the interface 142 in this example. The user enters the license information based on their records of license agreements and any maintenance agreements. Those identifiers may be "noisy". As indicated at 80, the identifiers are "standardized" by the process, using the catalogue and dictionary, which will be described with reference to FIGS. 6 to 8. That process involves reference to the catalogue 161 and the dictionary 162. The result is a licensing and maintenance database of standardized identifiers as indicated at 82.

As indicated at 83, usage data relating to the usage of the software installed on the computers is obtained from the systems management tool 10 and stored locally. The agents A on the computers of the network report the usage of the software installed on them to the systems management tool. The usage data is preferably standardized as indicated at 84 by the process which involves reference to the catalogue 161 and the dictionary 162 of FIGS. 6 to 8.

The usage data has the form by way of simplified example:

| Machine ID | Publisher | Product | Release | Product Code | Usage Time |
|---|---|---|---|---|---|
| 1 | Pub1 | Prod1 | Rel1 | ProdCode1 | 1/11/2010 10:20 |
| 2 | Pub1 | Prod1 | Rel1 | | 2/10/2010 9:54 |
| 3 | Pub1 | Prod1 | Rel1 | ProdCode2 | 3/8/2010 14:44 |

In comparison to the usage data, the corresponding installation data has the form by way of simplified example

| Machine Id | Publisher | Product | Release | Product Code |
|---|---|---|---|---|
| 1 | Pub1 | Prod1NotQuiteSame | Rel1NotQuiteSame | ProdCode1 |
| 2 | Pub1 | Prod1Different | Rel1Different | ProdCode2 |
| 3 | Pub1 | Prod1AlsoDifferent | Rel1DifferentAgain | ProdCode2 |

The standardized usage data is processed as indicated at 85 by a process which will be described with reference to FIG. 9. The processed usage data is added linked or otherwise associated with the corresponding standardized identification data in the installation database 163 as indicated at 86.

As indicated at 87, the software usage and identification data associated with each one of the computers 2, 8 is checked to determine if it is trustworthy. Whilst FIG. 5 shows "trust" is determined at 87 it may be determined at any other suitable stage. In this example there are two components of trust: data relating to the computer and data relating to software installed on a computer. As discussed above an agent on a computer reports regularly to the systems management tool. If no reports have been received from a computer for a predetermined period of time, e.g. one year or any other chosen period, data relating to that computer is not used. If software on a computer has not been used over a predetermined period of time (e.g. one year or any other chosen period) and there is similarly no reported use on other computers over that time, the data relating to that software is not used. Checking trust is not essential, but is preferable, because it improves reliability.

As indicated at 88, the standardized identification data and the processed usage data are correlated with the standardized license and maintenance data and the correlated data used as indicated at 89 as will be described later.

Figure 6A:
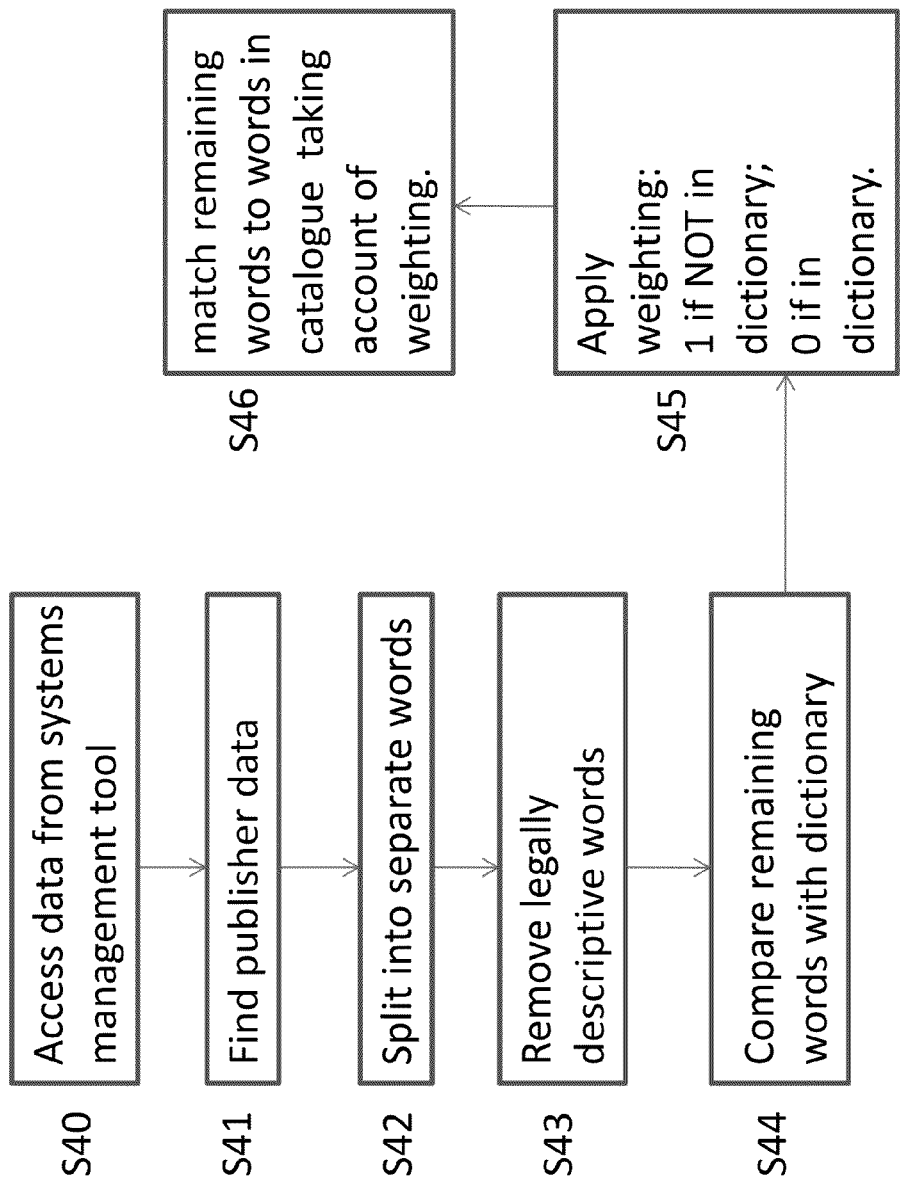
FIGS. 6A and 6B are flow diagrams illustrating a process of establishing a publisher name.
Figure 6B:
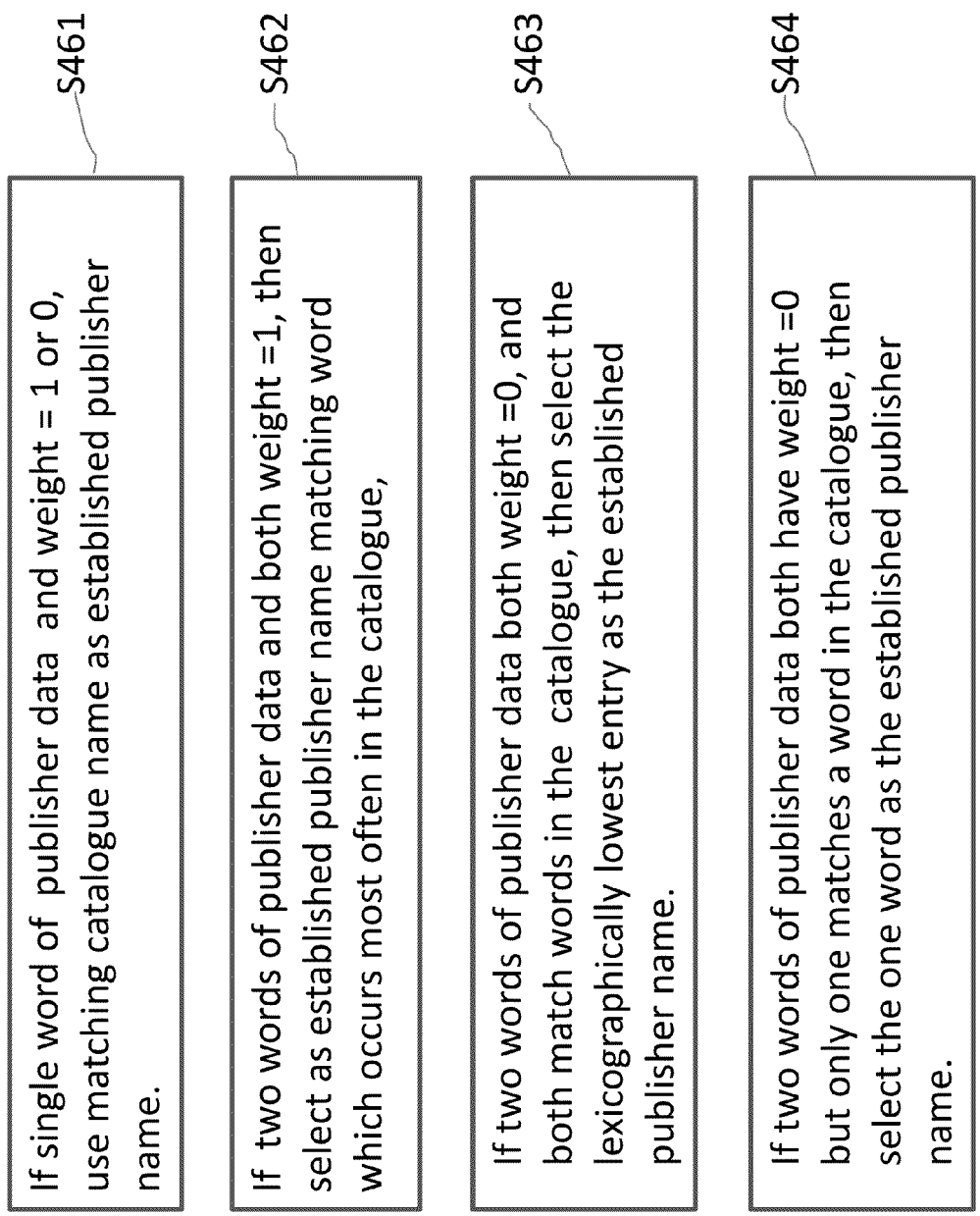
Figure 7:
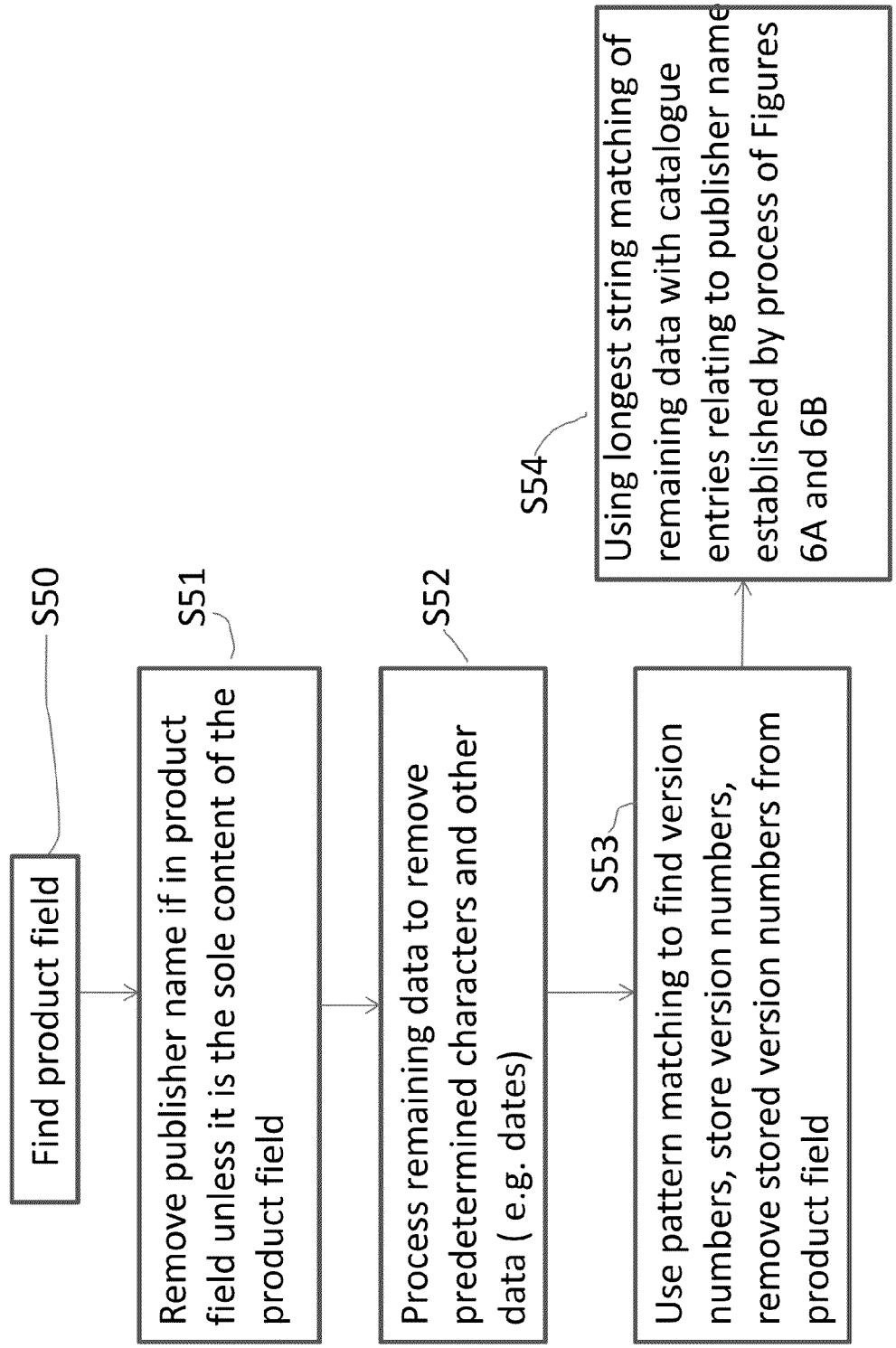
FIG. 7 is a flow diagram illustrating a process of establishing a product name.
Figure 8:
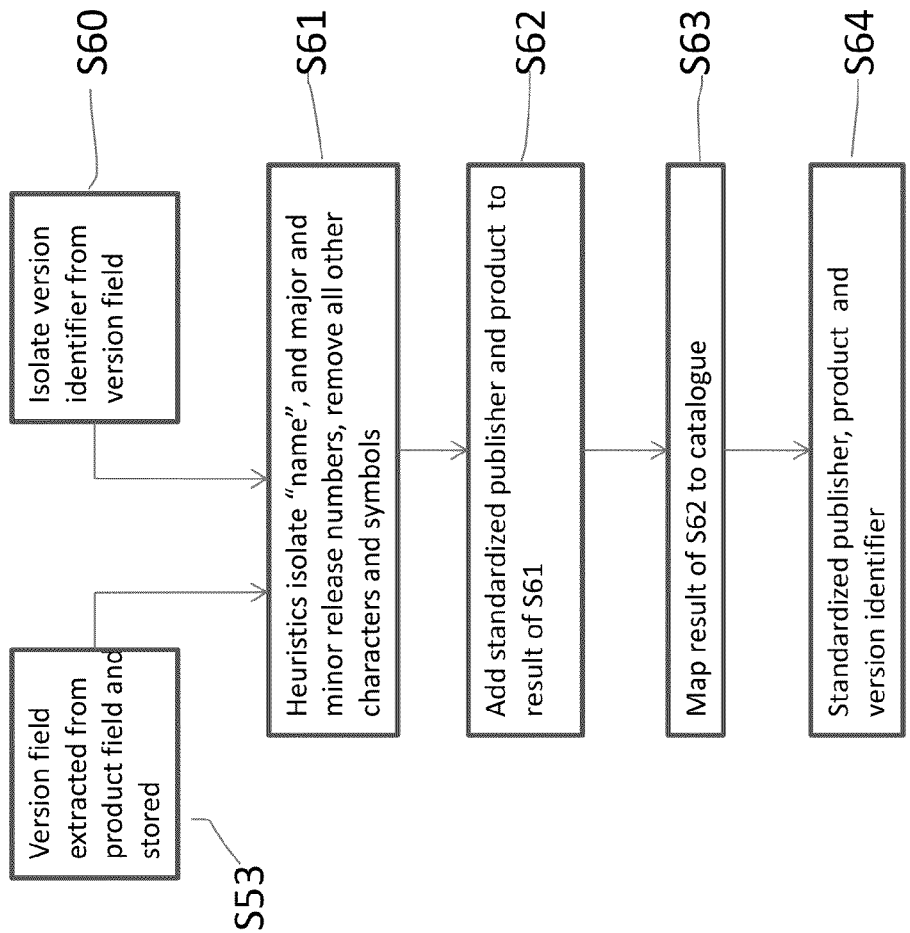
FIG. 8 is a flow diagram illustrating a process of establishing a version identifier.

Processing the Software Identification Data—FIGS. 6 to 8

One embodiment of the mapping process is described with reference to FIGS. 6 to 8. The process maps the noisy data to the catalogue.

There are three data items interest and each is processed in a different way: Publisher, Product, version identifier.

Examples of noisy data are:

| 1. | Microsoft Systems | Office Enterprisev10 | <blank> |
| 2. | Microsoft Systems Ltd | Office Enterprise2010 | 10.0.0.3 |
| 3. | Microsoft GMBH | Office Enterprise Gold | 10.0.200.1 |
| 4. | Microsoft Plc | Microsoft Office Standard | 10.0.0.3 |
| 5. | Microsoft | Office Standard2010v10 | <blank> |

There are two real products here which appear in the catalogue as:

| Microsoft | Office Enterprise | 2010 10.0 |
| Microsoft | Office Standard | 2010 10.0 |

The year number, in the examples above "2010", is deemed to be part of the version identifier in the catalogue. It may be omitted from some software identifiers.

Processing Publisher Data—FIG. 6A

Referring to FIG. 6A, the noisy identification data is derived S40 from the database 101 of the systems management tool 10. A known program returns the publisher, product and release number from the systems management tool in distinct fields.

Step S41 starts the process by finding the publisher data.

Step S42 splits the publisher field into individual works. For example, if the publisher data is Microsoft plc it is split into Microsoft and plc.

Step 43 removes words like plc or GMBH or any other legally descriptive words. That may be done by creating a list of such words, comparing the words of the publisher data with the list and removing any word which matches any word in the list.

So step S43 produces

| 1. | Microsoft Systems | Office Enterprisev10 | <blank> |
| 2. | Microsoft Systems | Office Enterprise2010 | 10.0.0.3 |
| 3. | Microsoft | Office Enterprise Gold | 10.0.200.1 |
| 4. | Microsoft | Microsoft Office Standard | 10.0.0.3 |
| 5. | Microsoft | Office Standard2010v10 | <blank> |

Step S44 compares the word(s) of the publisher name with the dictionary. It is expected that names such as "Microsoft" will not appear in the dictionary but other words, e.g. "system" will be in the dictionary.

Step S45 applies a weighting to each word of the publisher's name: for example 1 if is NOT in the dictionary and 0 if it is. The assumption here is that publisher names are not in the dictionary. Words such as "apple", and "adobe", which are also words used in publisher's names, are exceptions to this and are dealt with as described below.

Step S46 attempts to match the word(s) of the publisher remaining after step S43 with words in the catalogue. An illustrative matching process is described with reference to FIG. 6B.

As shown at step S461, if the there is only a single word of publisher name which matches a word in the catalogue, the matching catalogue name is taken as the established publisher name whether the word is weighted 1 or 0. For example, if the single word is "Microsoft", that is taken as the established publisher name.

As shown at step S462, if there are two words in the publisher name, e.g. Microsoft Systems, and one (e.g. "Microsoft") is weighted 1 and the other ("systems") is weighted 0 then the word weighted 1 (Microsoft) is taken as the publisher name because it has the greater weight because it is not in the dictionary.

As shown at step S463, if there are for example two words both NOT in the dictionary (i.e. both have weight=0) but both words are in the catalogue, (for example Microsoft Softsys) then the word occurring most often as publisher in the catalogue is chosen as the established publisher name.

So, at the end of step S461, the software identifiers are changed to

| 1. | Microsoft | Office Enterprisev10 | <blank> |
| 2. | Microsoft | Office Enterprise2010 | 10.0.0.3 |
| 3. | Microsoft | Office Enterprise Gold | 10.0.200.1 |
| 4. | Microsoft | Microsoft Office Standard | 10.0.0.3 |
| 5. | Microsoft | Office Standard2010v10 | <blank> |

The publisher name has been matched to the catalogue.

An exceptional case is where you have an English word such as "apple" as a publisher name. For example:

Apple Systems

Apple Eastern Division

Apple.

In these examples all the words are in the dictionary. As shown at step S461, if there is only a single word, e.g. Apple, step S461 attempts to match it to the catalogue (in this case Apple is in the catalogue). If there are two or more words all in the dictionary and in the catalogue (e.g. Apple Systems), as set out in S463, the matching selects the lexicographically lowest entry, again Apple in this case.

As set out in S464, if for example the word Apple is in the catalogue but Systems, Division or Eastern is not in the catalogue, Apple is selected as the publisher name.

Processing Product Data—FIG. 7

Step S50 finds the product field. The inventor has found that the product field often contains the publisher name. Step S51 removes the publisher unless it is the sole content of the product field: "winzip" is an example where the publisher name and the product name are the same. Data may be identified as a publisher name by comparing the data with publisher names in the catalogue. The result of step S51 is:

| 1. | Microsoft | Office Enterprisev10 | <blank> |
| 2. | Microsoft | Office Enterprise2010 | 10.0.0.3 |

|   |           |                      |            |
|---|-----------|----------------------|------------|
| 3.| Microsoft | Office Enterprise Gold | 10.0.200.1 |
| 4.| Microsoft | Office Standard       | 10.0.0.3   |
| 5.| Microsoft | Office Standard2010v10 | <blank>   |

"Microsoft" is gone from the product name of example 4.

Step S52 processes the remaining information via a number of regular expressions. This removes characters, dates and other data in a list of regular expressions.

Step S53 attempts to find anything looking like a version identifier. Step 53 in this example uses heuristics that find version identifier by pattern matching. For example a heuristic detects: dots; v followed by a number; and other indicators of version identifiers. Step S53 removes the version identifiers but also stores the removed version identifiers for use later. Step S53 produces

|   |           |                        |            |
|---|-----------|------------------------|------------|
| 1.| Microsoft | Office Enterprise      | <blank>    |
| 2.| Microsoft | Office Enterprise      | 10.0.0.3   |
| 3.| Microsoft | Office Enterprise Gold | 10.0.200.1 |
| 4.| Microsoft | Office Standard        | 10.0.0.3   |
| 5.| Microsoft | Office Standard        | <blank>    |

Step S54 performs a catalogue match against the products of the publisher established in the process of FIG. 6. Step S54 does a longest substring match. This is because if for example the product name includes "Office" it should not match "Office Enterprise" unless it also includes "Enterprise". If an exact match is found, that is taken as the established product name. If not, then step S54 keeps a substring score. For example, if the process tries to match the string "Office Enterprise Gold" and "Office" is in the catalogue, 6 letters match perfectly but the process continues to find a better score. If "Office Enterprise" is in the catalogue, that provides an even better score (17 characters). If no better score is found the product name in the catalogue which produces the highest score is used as the established product name.

The result of step S54 is

|   |           |                   |            |
|---|-----------|-------------------|------------|
| 1.| Microsoft | Office Enterprise | <blank>    |
| 2.| Microsoft | Office Enterprise | 10.0.0.3   |
| 3.| Microsoft | Office Enterprise | 10.0.200.1 |
| 4.| Microsoft | Office Standard   | 10.0.0.3   |
| 5.| Microsoft | Office Standard   | <blank>    |

Thus the product name is established.

Processing the Version Identifiers FIG. 8.

Processing the version identifiers aims to provide a name (for example a year number) and major and minor release numbers.

Step S53 of FIG. 6 may have stored a version identifier extracted from the product field. There may be at least a release number in the version field, but often the version field is blank.

Step S60 extracts the version identifier (if any) from the version field of the data obtained from the SMT database 101.

The version identifier (if it exists), whether derived from step S53 or from a non-empty version field, is processed in step S61 using heuristics attempting to extract a name (e.g. a year number if it exists and major and minor release numbers.

For example referring to the examples of identifiers again,

|   |           |                   |         |
|---|-----------|-------------------|---------|
| 1.| Microsoft | Office Enterprise | <blank> |

Note: The "10.0" removed from the product data was stored in step S53

|   |           |                   |      |
|---|-----------|-------------------|------|
| 2.| Microsoft | Office Enterprise | 10.0 |

Note: The name "2010" removed from the product data was stored in step S53. The "0.3" is removed by the heuristics of step S61 because the catalogue data includes only major and minor release numbers

|   |           |                   |      |
|---|-----------|-------------------|------|
| 3.| Microsoft | Office Enterprise | 10.0 |
| 4.| Microsoft | Office Standard   | 10.0 |

Notes: The name "2010" removed from the product data was stored in step S53. The "200.1" is removed by the heuristics of step S61 because the catalogue data includes only major and minor release numbers.

|   |           |                 |         |
|---|-----------|-----------------|---------|
| 5.| Microsoft | Office Standard | <blank> |

Note: The "10.0" removed from the product data was stored in step S53.

Step S62 adds any data stored in step S53 and processed by step S61 to the publisher and product names established from the catalogue. It also adds any the version identifier derived from a non-blank version field and processed by step S61.

For example, the result of step S62 is

|   |           |                   |           |
|---|-----------|-------------------|-----------|
| 1.| Microsoft | Office Enterprise | 10.0      |
| 2.| Microsoft | Office Enterprise | 2010 10.0 |
| 3.| Microsoft | Office Enterprise | 10.0      |
| 4.| Microsoft | Office Standard   | 2010 10.0 |
| 5.| Microsoft | Office Standard   | 10.0      |

Step S63 matches the publisher and product names to names in the catalogue and then tries to find the best version data in the set of catalogue data of the matched publisher and product names. For example, for

|   |           |                   |           |
|---|-----------|-------------------|-----------|
| 1.| Microsoft | Office Enterprise | 10.0      |
| 2.| Microsoft | Office Enterprise | 2010 10.0 |
| 3.| Microsoft | Office Enterprise | 10.0      | line 2 has a version name (2010) and they all have matching major and minor release numbers so we can also use the version name for 1 and 2 resulting at S64 in the established data.

|   |           |                   |           |
|---|-----------|-------------------|-----------|
| 1.| Microsoft | Office Enterprise | 2010 10.0 |
| 2.| Microsoft | Office Enterprise | 2010 10.0 |
| 3.| Microsoft | Office Enterprise | 2010 10.0 |

The same applies to the Office standard entries and steps S63 and S64 provide:

|   |           |                   |           |
|---|-----------|-------------------|-----------|
| 1.| Microsoft | Office Enterprise | 2010 10.0 |
| 2.| Microsoft | Office Enterprise | 2010 10.0 |
| 3.| Microsoft | Office Enterprise | 2010 10.0 |
| 4.| Microsoft | Office Standard   | 2010 10.0 |
| 5.| Microsoft | Office Standard   | 2010 10.0 |

Variations

Sometimes the publisher field is missing but the publisher data appears in the product field. If so the publisher data is taken from the product field and put into the publisher field.

This may be achieved by determining if the publisher field is blank and then examining the product field. The product field in then processed as set out in steps S42 to S46 in FIG. 6A. The publisher name (e.g. Microsoft) is likely to be NOT in the dictionary so it will be weighted 1. Any word of weight 1 in the product field when there is no data in the publisher field is put into the publisher field. Then the publisher field is processed according to FIG. 6B.

Some publisher names are also dictionary words: e.g. adobe. They can be found by matching words in the product field with publisher names in the catalogue.

If the publisher data is missing, the product and version as processed by the processes of FIGS. 6 to 8, and matched to product and version data in the catalogue so that the publisher can be inferred from the catalogue data.

Result of Processing

The result of the processing of FIGS. 2 to 8 is the installation database 163 contains, for each computer associated with the network, the identifier (e.g. a GUID) of the computer and a list of standardised software identifiers complying with the identifiers in the catalogue database 161 identifying the software installed on the computer. That allows the managers of the network to more easily manage the software on the network because all software is identified in a standardised way. For example, as will be described, the standardised identification facilitates management of licensing and maintenance of software and thus cost control.

Product Codes

The installation database 163 also includes the product codes of the identified software. The product codes may be GUIDs. The product codes are derived from data in the software. Authors of software should include product codes but in practice they are sometimes omitted. The catalogue may also include product codes but may be only sparsely populated with product codes or they may be absent, Processing Usage Data—FIG. 9

Usage data for software installed on each computer on the network is stored in the database 101 of the Systems Management Tool 10. Collection of such usage data is a known function of a Systems Management Tool which uses the agents A on the computers to collect the usage data.

The usage data has the form by way of simplified example:

| Machine ID | Publisher | Product | Release | ProductCode | Usage Time |
|---|---|---|---|---|---|
| 1 | Pub1 | Prod1 | Rel1 | ProdCode1 | 1/11/2010 10:20 |
| 2 | Pub1 | Prod1 | Rel1 | | 2/10/2010 9:54 |
| 3 | Pub1 | Prod1 | Rel1 | ProdCode2 | 3/8/2010 14:44 |

The corresponding installation data has the form by way of simplified example

| Machine ID | Publisher | Product | Release | Product Code |
|---|---|---|---|---|
| 1 | Pub1 | Prod1NotQuiteSame | Rel1NotQuiteSame | ProdCode1 |
| 2 | Pub1 | Prod1Different | Rel1Different | ProdCode2 |
| 3 | Pub1 | Prod1AlsoDifferent | Rel1DifferentAgain | ProdCode2 |

The processing of the usage data attempts to match the usage data to the standardised software identification data in the installation database. The processing of the usage data aims to identify the usage of software installed on the individual computers and to add, or otherwise link, the usage data to the standardised identification data in the installation database 163.

The usage data derived from the installed computers includes product codes.

Figure 9:
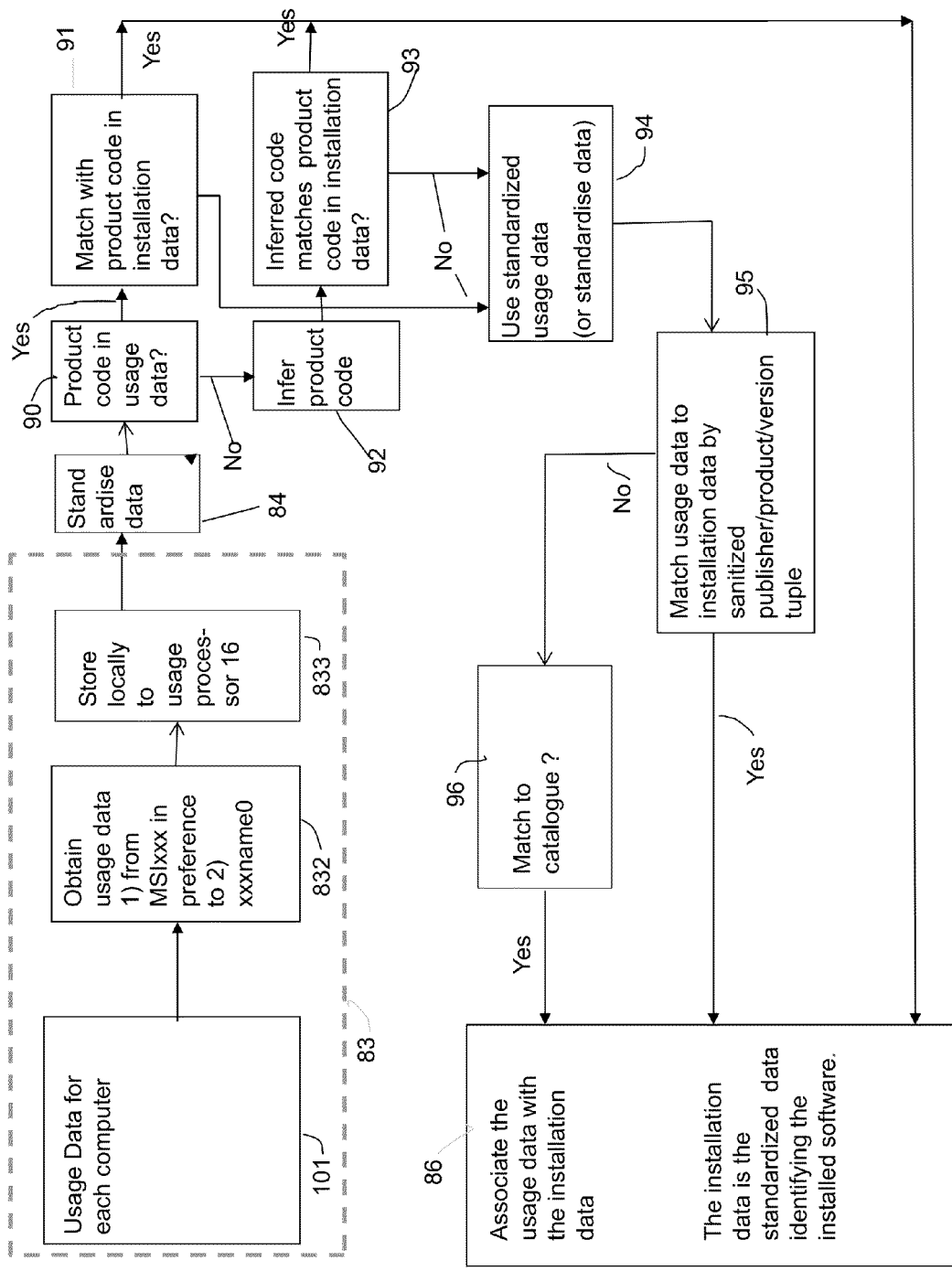
FIG. 9 is a schematic flow diagram of an overview of processes carried out by an example of the present invention for matching data relating to the use of software to the data identifying the installed software.

Referring to FIGS. 5 and 9, as shown at step 83, the database 101 of the Systems Management Tool 10 is accessed. In this example, the database 101 contains usage data relating to software which has been installed using Microsoft Installer (MSI data MSIxxx) and other data (non-MSI data xxxxname) relating to installed software. As shown at step 832 usage data is obtained from MSI data in the database 101 in preference to non-MSI data because the MSI data is regarded as more accurate than the other data. The data obtained in step 832 is stored locally to the usage processor 16 in the usage database 164 in step 833.

The stored data is standardized as indicated at 84 using the processes of FIGS. 2 to 8. This is preferable but not essential at this stage as will be discussed later.

For each item of software installed on a particular computer the following occurs.

Step 90 determines if a product code is in the standardized usage data. If yes, then step 91 attempts to match the product code in the usage data with a product code in the installation data (i.e. the standardised software identification data). If the product code matches with one in the installation data, the installation data is associated with the usage data as indicted at 86.

If step 90 does not find a product code in the usage data, step 92 attempts to infer a product code. A product code is inferred by matching the publisher name-product name-version identifier-tuple of the software associated with the usage data with that of other software which has a product code. If there are multiple product codes which all group to the same publisher-product-version-tuple, then all those product codes are considered as a bundle. The bundle is then used to match up corresponding data relating to software installed on the particular computer. The usage data is then associated at step 86 with the installation data which can be matched to the bundle of product codes.

If there is no standardising step 84 and if no match can be achieved using product codes (whether inferred or not), then the step 94 standardises the usage data.

Step 95 attempts to match the usage data to the installation data using the sanitized publisher name-product name-version identifier-tuples in the usage data and the installation data. If a match is found, the installation data is associated with the usage data: if not step 96 is carried out.

In step 96, the usage data is compared with the catalogue to find a match. Also installation data is compared with the catalogue to find a match. If installation data and usage data match the same data in the catalogue, then the usage data is deemed to be associated with the installation data.

If product codes are present in the catalogue, usage data may be linked to installation data using the product codes and the catalogue.

Result of FIG. 9 Processing

The processing of FIG. 9 provides a data table or linked tables which, for each computer, list the standardized identifiers of the software installed on the computer together with data relating to the usage of the software.

Network Management

The data produced by the processing of FIGS. 2 to 9 may be used to manage the network and more particularly manage the software installed on the network and/or manage licenses and/or maintenance agreements associated with the software.

The license database 141 contains data which has been standardised as indicated at 78, 80 and 82 in FIG. 5. The license database is maintained by the user because they have the information about their software and any licenses. The user populates the database according to guidelines and rules set to provide consistency between the data in the license data base and the catalogue. The data in the license database 141 is also standardised as indicated at 78, 80 and 82 in FIG. 5 to correct errors. In an example of the present invention, the catalogue includes for each software item an indication of whether it should be licensed. The installation data is compared with the catalogue to determine if a license is required and if so the user's license database is checked to determine if a license exists. If not an indication is provided to the user indicating a license is required and/or no license information is present in the license database.

One embodiment of the invention aims to monitor license compliance. The embodiment finds out what how many packages of a particular software are installed, finds out how many licenses have been bought, and then indicates compliance, or not compliance, with the terms of the licenses. If there are more licenses than needed some maybe cancelled. If there are insufficient licenses more may be bought. The embodiment may automatically generate a report.

Another embodiment uses the usage data to aid in deciding whether to uninstall software which is not used and/or re-allocate any associated license. The embodiment may automatically generate a report.

Another embodiment uses the usage data to determine if installed software is inappropriate to any user. The usage data may be used to determine if other software is more appropriate to any user(s).

Another embodiment determines whether various different versions or releases of the same software are present on the network. The embodiment may automatically generate a report. The various versions may be replaced by a single version, which may assist in reducing support costs Another embodiment considers the combination of a product license and a maintenance contract: the combination is termed herein the "effective license". The maintenance contract may not coincide in time with the product license: for example maintenance may need renewal annually whilst the product license may be a one-off cost. The embodiment aims to monitor the effective license. Is there for example a gap in the maintenance: has the maintenance lapsed? The embodiment provides a rules engine to determine whether product license is currently valid and whether the maintenance is up to date and to produce a report on compliance. A manager can decide to reallocate licenses, and/or uninstall software, and/or buy more maintenance or stop maintenance.

Such embodiments depend on reliable identification of the installed software. The processes of FIGS. 2 to 9 provide reliable identification of installed software. The identifiers used in the catalogue are also used in the license database and identifiers of software installed on the network are mapped to the catalogue so software is identified in a consistent manner. That allows reliable identification of software and correlation with the license database. It allows managers to manage software on the network more reliably because the software is identified in a standardized manner.

Un-Installing Software

Figure 10:
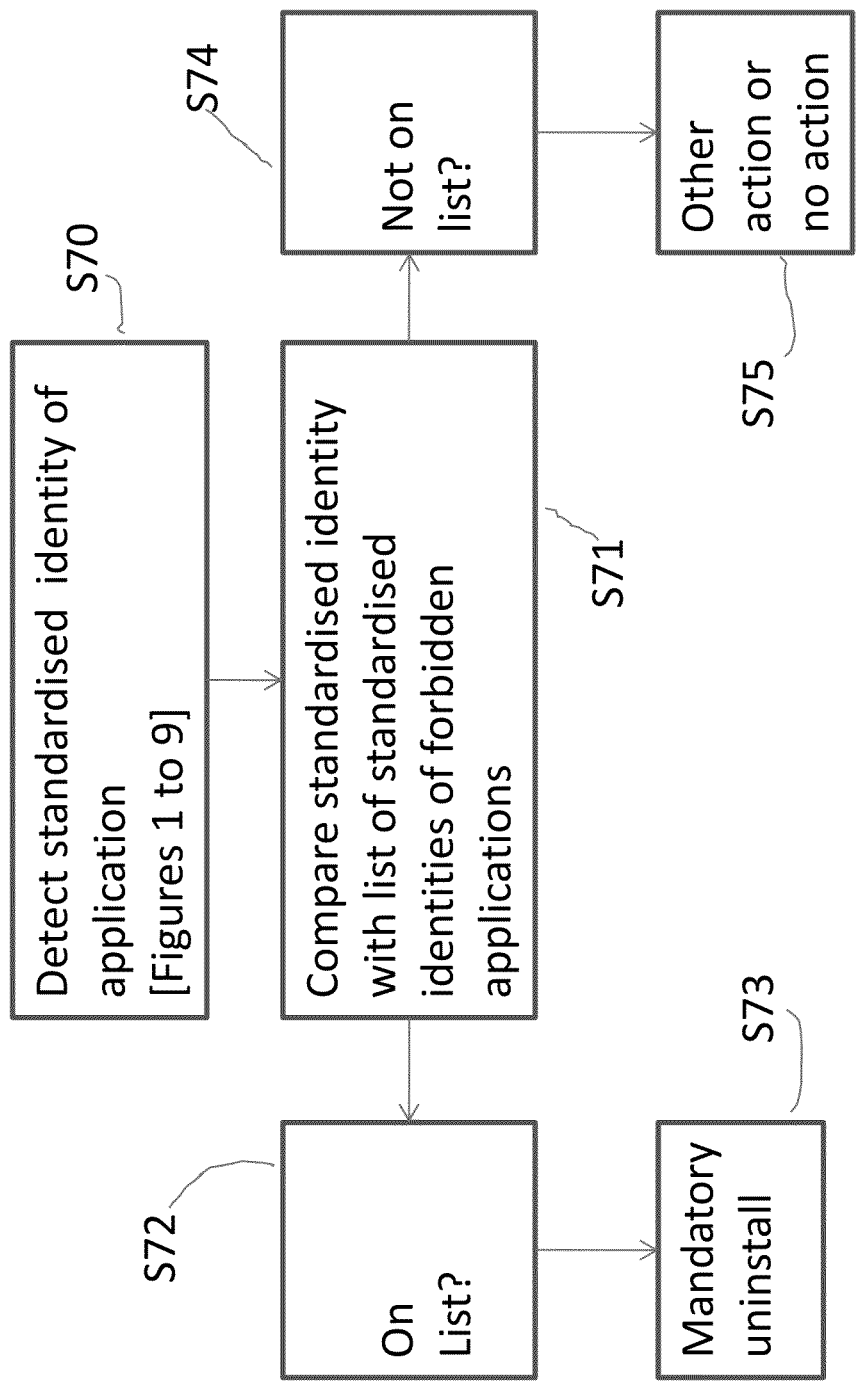
FIG. 10 is a schematic flow diagram of a process for uninstalling identified software.

FIG. 10 shows a process of uninstalling software which is deemed to be forbidden. In step S70, the identity of software, for example an application program, is established as discussed above with reference to FIGS. 1 to 9. The established identity is compared in step S71 with a predetermined list of software which is deemed forbidden. If the identified software is on the forbidden list, as indicated at step S72, it is compulsorily un-installed. The un-installation may be automatic. If the software is not on the forbidden list as indicated as S74, either no action is taken or other action may be taken. The other action may be that of FIG. 11.

Figure 11:
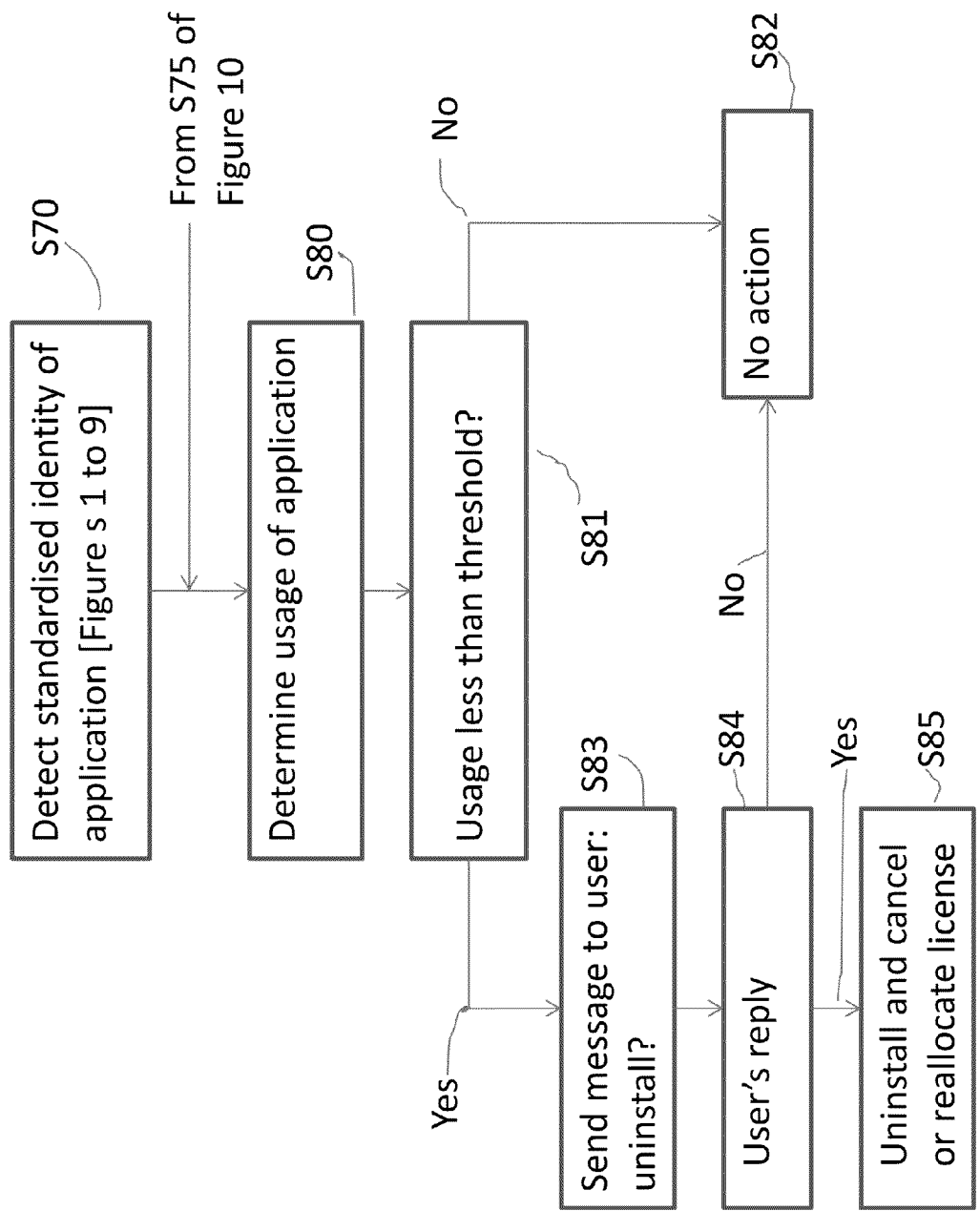
FIG. 11 is a schematic flow diagram of another process for uninstalling identified software.

FIG. 11 shows a process for uninstalling un-used or underused software. In step S70, the identity of software, for example an application program, is established as discussed above with reference to FIGS. 1 to 9. In step S80, the usage of the software is determined. That may be done for example by accessing the database 101 of the Systems Management Tool 10. Referring to FIG. 9, in this example, the database 101 contains usage data relating to software which has been installed using Microsoft Installer (MSI data MSIxxx) and other data (non-MSI data xxxxname) relating to installed software. As shown at step 832 usage data is obtained from MSI data in the database 101 in preference to non-MSI data because the MSI data is regarded as more accurate than the other data. The data obtained in step 832 is stored locally to the usage processor 16 in the usage database 164 in step 833. The usage data is associated with standardised identities as described in FIG. 9. As indicated at S82, if the usage exceeds the threshold, then no action is taken: i.e. the software is not un-installed. If the usage is less than the threshold, then at step S83, a message, e.g. an email, is sent to the user to ask permission to uninstall the software. If the user refuses permission at step S84 then no action is taken as indicated at S82. If the user gives permission at step S84, the software is uninstalled and reallocated to another user or the license is cancelled as indicated at S85.

The process of steps S80 to S85 of FIG. 11 may follow the process of FIG. 10 as the other action of step S75. The process of FIG. 10 and/or 11 may be carried out by an un-installation engine run in the identification and usage processor 16 of FIG. 1. When software is un-installed the database 101 of the Systems management tool 10 and the installation database 164 are updated.

Computer Programs and Program Carriers

Embodiments of the invention may be implemented by a program or a set of programs which, when run on a computer or set of computers, causes the computer(s) to implement the methods described herein above. In one illustrative implementation of the invention the programs include software implementing the identification processing as indicated in FIG. 5 for example.

Software may be provided to correlate the identified installed software and usage data with data in a licensing data base as indicated at 88 in FIG. 5 for example.

Software may be provided to aid network management as described above.

The program or programs may be carried by one or more carriers. A carrier may be a signal, a communications channel, a non-transitory medium, or a computer readable medium amongst other examples. A computer readable medium may be: a tape; a disc for example a CD or DVD; a hard disc; an electronic memory; or any other suitable data storage medium. The electronic memory may be a ROM, a RAM, Flash memory or any other suitable electronic memory device whether volatile or non-volatile.

The above embodiments are to be understood as illustrative examples of the invention. Further embodiments of the invention are envisaged. Whilst FIG. 5 indicates a combination of identification data and usage data is correlated with the license data base, as indicated by 79, the identification data may be correlated with the license database without the usage data. Although the invention has been described by way of example to a network of computers it may be applied to a single computer. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A computer implemented method of establishing the identity of software installed on a computer having a processor, the software being purportedly identified by identification data associated with the installed software, the method using a catalogue of established software identification data, the method comprising:
mapping, by the processor, the purported identification data to established identification data in the catalogue having the form publisher name, product name and version identifier, the mapping including:
processing the purported identification data to isolate portions of the purported identification data apparently respectively corresponding to a publisher name,
comparing an isolated purported publisher name with words in a dictionary,
weighting the name with a first weight if the name is not in the dictionary and with a second weight if the name is in the dictionary, and
matching the purported publisher name to a publisher name in the catalogue in dependence on the weighting;
using, in further processing by the processor, the identification data to which the purported data is mapped as the established identification data of the installed software;
determining whether to uninstall identified software according to at least one predetermined un-installation criterion; and
un-installing the software if the at least one criterion is satisfied.

2. The method according to claim 1, wherein the mapping further comprises processing the purported identification data to isolate portions of the purported identification data apparently respectively corresponding to a product name and a version identifier.

3. The method according to claim 2, wherein processing the purported identification data to isolate the portions of the purported identification data comprises removing data representing predetermined symbols and other predetermined data.

4. The method according to claim 3, wherein processing the purported identification data comprises a first process of processing the publisher name, a second process of processing the product name, and a third process of processing the version identifier, and wherein the second process uses the result of the first process and the third process uses the results of the first and second processes.

5. The method according to claim 2, further comprising mapping each of the portions of the purported identification data to a corresponding portion of the established data in the catalogue.

6. The method according to claim 5, further comprising:
comparing two isolated words which purport to be parts of a publisher name with words in a dictionary;
weighting each word with a first weight if it is not in the dictionary and with a second weight if it is in the dictionary; and
selecting from the catalogue as the established publisher name the one of the words occurring most often in the catalogue if both words have the first weight.

7. The method according to claim 5, further comprising:
comparing two isolated words which purport to be parts of a publisher name with words in a dictionary;
weighting each word with a first weight if it is not in the dictionary and with a second weight if it is in the dictionary; and
if both words have the second weight, selecting from the catalogue as the established publisher name the either the one of the words occurring in the catalogue or the lexicographically lowest word if both occur in the catalogue.

8. The method according to claim 5, wherein the step of mapping the product name to the established product name in the catalogue comprises matching the product name to products associated with the established publisher name.

9. The method according to claim 8, further comprising removing from the product name predetermined symbols and other predetermined data.

10. The method according to claim 8, further comprising detecting data in the product name which may be a version identifier and removing that data from the product name, and storing the removed data.

11. The method according to claim 5, wherein mapping the version identifier to the established version identifier in the catalogue comprises removing from the version identifier predetermined symbols and other predetermined data, then combining the resulting version identifier with the established publisher and product names, and matching the combination to the catalogue.

12. The method according to claim 1, wherein the step of using the established identification data comprises correlating the established identification data to data identifying licensed software in a licensing database.

13. The method according to claim 12, further comprising mapping identification data in the licensing database to established identification data in the catalogue.

14. The method according to claim 1, further comprising obtaining usage data, mapping the usage data to data in the catalogue, and processing the mapped usage data to associate it with corresponding established identification data.

15. The method according to claim 14, wherein processing the usage data comprises matching a product code of the usage data to a product code associated with the identification data.

16. The method according to claim 15, wherein, if no product code is present in the usage data, the product code is inferred from the usage data associated with other software having matching identification data.

17. The method according to claim 15, wherein, if matching by product code is not achieved, the usage data is matched to identification data using publisher-product-version identification data of the usage data and of the identification data.

18. The method according to claim 14, further comprising matching usage data to data in the catalogue, matching identification data to data in the catalogue and associating the usage data with the identification data if both match to the same data in the catalogue.

19. The method according to claim 14, further comprising using a combination of identification data and usage data to manage the identified software.

20. The method according to claim 19, wherein the at least one criterion is usage of the software is less than a threshold and the user agrees to un-installation.

21. The method according to claim 1, wherein there are two criteria, one criterion being usage of the software is less than a threshold and another is the user agrees to un-installation.

22. The method according to claim 21, further comprising sending the user a message if the usage of the software is less than the threshold, and un-installing the software if the user indicates agreement to un-installation.

23. The method according to claim 1, wherein the criterion is whether the established identification data matches data in a list of forbidden software and comprising compulsorily un-installing the software if the criterion is satisfied.

24. The method of claim 23, wherein, if the identification data does not match data in the list of forbidden software, the method further comprises determining if usage of the software is less than a threshold and s the user agrees to un-installation, and, if so, un-installing the software.

25. A non-transitory computer readable medium storing a computer program including a set of instructions which, when run on a processor, cause the computer to establish the identity of software installed on another computer, the software being purportedly identified by identification data associated with the installed software, the instructions comprising:
    accessing a catalogue of established software identification data having the form publisher name, product name and version number;
    mapping the purported identification data to the established identification data in the catalogue, the mapping including:
        processing the purported identification data to isolate portions of the purported identification data apparently respectively corresponding to a publisher name,
        comparing an isolated purported publisher name with words in a dictionary,
        weighting the name with a first weight if the name is not in the dictionary and with a second weight if the name is in the dictionary, and
        matching the purported publisher name to a publisher name in the catalogue in dependence on the weighting;
    using the identification data to which the purported data is mapped as the established identification data of the installed software;
    determining whether to uninstall identified software according to at least one predetermined un-installation criterion; and
    un-installing the software if the criterion is satisfied.

26. A computer system, comprising:
a plurality of user computers coupled to a network; and
one or more administrative computers, coupled to the network, on which a systems management tool and an identification data processing engine are installed,
wherein the systems management tool stores software identification data and computer identifiers identifying the software installed on the user computers, and usage data relating to the usage of the installed software,
wherein the identification data processing engine has a catalogue of standardised software identification data having the form publisher name, product name and version number,
wherein the identification data processing engine is configured to map identification data derived from the systems management tool to the standardised identification data of the catalogue to produce standardised identifiers of the installed software, including:
    processing the identification data to isolate portions of the identification data apparently respectively corresponding to a publisher name,
    comparing an isolated publisher name with words in a dictionary,
    weighting the name with a first weight if the name is not in the dictionary and with a second weight if the name is in the dictionary, and
    matching the publisher name to a catalogue publisher name in dependence on the weighting, and
wherein an un-installation data processing engine is configured to determine whether to uninstall identified software according to a predetermined un-installation criterion, which un-installs the software if the criterion is satisfied.

27. The computer system according to claim 26, wherein:
the administrative computer has a license management tool installed thereon which stores data identifying licensed software and the computers on which the license management tool is installed;
the identification data processing engine is further configured to:
    map identification data derived from the systems management tool to the standardised identification data of the catalogue to produce standardised identifiers of the installed software,
    map identification data derived from the license management tool to standardised identification data of the catalogue to produce standardised identifiers of the licensed software, and
    map usage data derived from the systems management tool to the standardised identifiers of the installed software; and
the license management tool is configured to correlate the standardised identifiers of the installed software and the usage data mapped thereto with the standardised identifiers of the licensed software.

28. The system according to claim 26, wherein the standardised identifiers have the form publisher name, product name, version identifier.

29. The system according to claim 28, wherein the version identifier has the form name or year, major release number, minor release number.

30. The system according to claim 27, wherein the catalogue includes data indicating which software should be licensed.

31. The system according to claim 26, the user computers include agents which report the identification data and usage of software installed thereon.

32. The system according to claim 31, wherein the identification data reported by the agents comprises such one or more of publisher name, product name and version identifier as exists for each item of software installed on the computers.

* * * * *